(12) United States Patent
Cernasov

(10) Patent No.: US 7,570,425 B2
(45) Date of Patent: Aug. 4, 2009

(54) SYSTEM, APPARATUS AND METHOD FOR HIGH EFFICIENCY LOW LEAKAGE LCD POLARIZER

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 286 days.

(21) Appl. No.: 11/373,277

(22) Filed: Mar. 13, 2006

(65) Prior Publication Data

US 2007/0211340 A1    Sep. 13, 2007

(51) Int. Cl.
*G02B 27/28* (2006.01)

(52) U.S. Cl. .............. 359/497; 359/489; 349/9; 349/96

(58) Field of Classification Search .......... 359/489
See application file for complete search history.

(56) References Cited

U.S. PATENT DOCUMENTS

| 5,570,210 | A | 10/1996 | Yoshida et al. |
| 6,160,595 | A | 12/2000 | Kishimoto |
| 6,317,180 | B1 | 11/2001 | Kuroiwa et al. |
| 6,364,497 | B1 | 4/2002 | Park et al. |
| 6,811,274 | B2 * | 11/2004 | Olczak ............ 362/606 |
| 6,951,400 | B2 * | 10/2005 | Chisholm et al. ........ 362/29 |

* cited by examiner

*Primary Examiner*—Arnel C Lavarias
(74) *Attorney, Agent, or Firm*—Ingrassia Fisher & Lorenz, P.C.

(57) ABSTRACT

An apparatus for a liquid crystal display includes a polarizer film configured to receive light from a liquid crystal display and an optical polarizer screen configured to filter light for the liquid crystal display. The optical polarizer screen has multiple grooves. Each groove includes a first transflective material and a second transflective material that differs from the first transflective material.

12 Claims, 5 Drawing Sheets

SYSTEM, APPARATUS AND METHOD FOR HIGH EFFICIENCY LOW LEAKAGE LCD POLARIZER

FIELD

This invention relates generally to display systems. More particularly, embodiments relate to a high efficiency, low-leakage liquid crystal display ("LCD") polarizer.

DESCRIPTION OF THE RELATED ART

A thin-film-transistor liquid crystal display (TFT/LCD), in general use for notebook computers, has a structure similar to that shown in FIG. 7. As shown in FIG. 7, the LCD 700 may include a backlight 705, a thin-film-transistor (TFT) glass 710, a color-filter glass 715, and the two cross-polarizers 720A, 720B attached to the color-filter glass and the TFT glass.

The backlight 705 is the light source for an LCD system 700. It typically consists of an acrylic light pipe with diffusive dots printed on its rear face, a lamp usually placed at one end of the light pipe, a reflective film on the rear face, and optical films on the front face to enhance the light output in the normal direction. Light from the lamp, which is conducted into the light pipe, travels longitudinally within the light pipe and is reflected by the diffusive dots and emitted out the front face of the pipe. The arrangement and density of the dots are controlled to achieve uniformity of light output throughout the front surface.

The TFT glass 710 has a matrix of transparent pixel electrodes with nonactive space between them. Each of the pixel electrodes corresponds to a color filter on the color-filter substrate. The nonactive area is coated with an absorptive material, which is called the black matrix. The aperture ratio is the proportion of the sum of all of the pixel electrode areas to the total area of the TFT glass 710.

The color-filter glass 715 also has a matrix of pixels. A triplet of red, green, and blue pixels forms a unit that works as a screen pixel. Each pixel on the color-filter substrate is aligned to a corresponding pixel electrode on the TFT glass 710.

An analysis of the LCD system 700 reveals that it is an optically very inefficient system. For example, in a 12.1-in. SVGA panel, currently in wide use for notebook computers, a mere 10% of the total light output from the backlight eventually reaches the viewer's eye; the rest is lost along the way. There are four major absorbers. The first is the polarizer 720a attached to the TFT glass 710. As the unpolarized output from the backlight passes through the polarizer 720a, its intensity is halved owing to complete absorption of one polarization component as well as some absorption of the other component. The second absorber is the black matrix on the TFT glass 710, an absorptive substance coated on the non-pixel area of the TFT glass 710. The amount of loss by the black matrix is proportionate to the non-pixel area, or the complement of the aperture ratio of the TFT glass 710. Since the aperture ratios of 12.1-in. SVGA panels range around 70%, the loss is approximately 30%. The third absorber is the color filter 715. Although various alternative filter schemes are being developed, the method currently in general use is pigment dispersion. Each pigment-dispersed pixel on the color filter transmits light in its specific wavelength range and absorbs the rest. The color-filter absorption is approximately 70%. The fourth absorber is polarizer 720b, which absorbs the unpolarized light from the color-filter glass 715. Finally, the combination of these four major factors yields the above-mentioned low figure of 10%.

Major efforts have naturally been directed toward eliminating the loss due to the dichroic polarizer because of the large loss associated with it. One solution is to pre-polarize light coming from the backlight without losing the second polarization component, so that the amount of loss by the cross polarizer is reduced proportionately as the rate of polarization increases. Several types of polarizers have been developed in this approach. They are implemented as an additional film placed on top of a conventional backlight to polarize the output. They typically have a reflective mechanism by which one polarization component is transmitted and the other is reflected. The reflected component is repeatedly reused by being depolarized and sent back into the film. These films are collectively classified as reflective polarizer films.

FIG. 8 illustrates a system 800 using reflective polarizer films. As shown in FIG. 8, the system 800 includes an LCD 805, diffusers 810*a-b*, a transflective film 815, a light guide 820, and a specular reflector 825.

Light with polarity of P1 and P2 is emitted from the light guide 820 towards the LCD 805. The light passes through the diffuser 810A which disperses light in wider angles. The light then interacts with the transflective film 815. More particularly, transflective film 815 allows light with P1 polarization through the diffuser 810*b* and to the LCD 805 while reflecting light with P2 polarization. The reflected P2 light is then reflected back to the LCD 805 by the specular reflector 825. The reflected light from the specular reflector 825 is scattered, i.e., having components of P1 and P2. This type of polarization recycling is a lossy process, where there is substantial loss due to the absorption and scattering.

SUMMARY

An embodiment generally relates to an apparatus for a liquid crystal display. The apparatus includes a polarizer film configured to receive light from a liquid crystal display and an optical polarizer screen configured to filter light for the liquid crystal display. The optical polarizer screen has multiple grooves. Each groove includes a first transflective material and a second transflective material that differs from the first transflective material.

Another embodiment generally pertains to a method of polarizing light. The method includes receiving unpolarized light at a groove having a first side and a second side and transmitting light of a first polarization from the first side of the groove. The method also includes transmitting light of a second polarization from the second side of the groove.

Yet another embodiment generally relates to an apparatus for improved light efficiency. The apparatus includes a polarizer film adapted to be in contact with a liquid crystal display and an optical polarizer screen adapted to filter light for the liquid crystal display. The optical polarizer screen includes a plurality of grooves, where each groove includes a first transflective material and a second transflective material that differs from the first transflective material.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
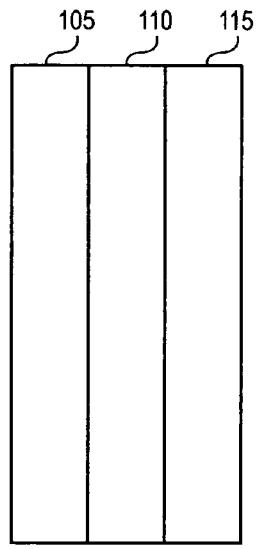
FIG. 1 illustrates an exemplary system in accordance with an embodiment of the invention.

For simplicity and illustrative purposes, the principles of the present invention are described by referring mainly to exemplary embodiments thereof. However, one of ordinary skill in the art would readily recognize that the same principles are equally applicable to, and can be implemented in, all types of liquid crystal display ("LCD") systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Embodiments generally relate to a high efficiency low leakage LCD polarizer system. More particularly, the optical polarizer screen comprises of a clear material, e.g., acrylic, with a large number of prismatic microgrooves (or a prism array) formed on one side. Each prismatic microgroove may be configured to have one side transflective to polarizations P1-P2 (transparent to P1, reflective to P2) and the opposite side transflective to P2-P1 (transparent to P2, reflective to P1). The prismatic microgrooves may also be configured with a reflector embedded in the clear material between the transflective materials. As a result of this configuration, the optical polarizer screen may output regions of P1 polarized light and regions of P2 polarized light in an alternating pattern.

The optical polarizer screen may be in contact with an LCD. On the viewing side of the LCD, a polarizer film may be in contact with this side of the LCD. The polarizer film may be configured with polarized P1 and P2 strips (or regions) in an alternating pattern. The polarized P1 strip may cover a corresponding P2 output from the prismatic microgroove of the optical polarizer screen through the LCD. Similarly, the P2 strip of the polarizer film may cover corresponding P1 output from the prismatic microgroove of the optical polarizer screen through the LCD. It should be readily apparent to those skilled in the art that an LCD array may be disposed between the optical polarizer screen and the polarizer film. Moreover, the pixels in the LCD array may rotate light proportional to the amount of voltage applied to the pixels.

FIG. 1 illustrates a block diagram of an exemplary system 100 in a side view where an embodiment may be practiced. It should be readily apparent to those of ordinary skill in the art that the system 100 depicted in FIG. 1 represents a generalized schematic illustration and that other components may be added or existing components may be removed or modified.

As shown in FIG. 1, system 100 may include an optical polarizer screen 105, an LCD array 110, and a polarizer film 115. The optical polarizer screen 105 may be configured to improve the efficiency of polarization or light recycling through the use of microgrooves or a prismatic array. More particularly, the optical polarizer 105 may include on one side a series of microgrooves embedded with two types of transflective material. One side of the microgroove may be coated with a transflective material that is transparent to light with the polarization of P1 and reflective to light with the polarization of P2. The second side of the microgroove may be coated with a second transflective material that is transparent to light with the polarization of P2 and reflective to light with the polarization of P1. Each microgroove maintains the order of transflective materials such that alternating pattern of transflective material is formed across the one side of the optical polarizer screen 105, which is illustrated with respect to FIG. 2.

Figure 2:
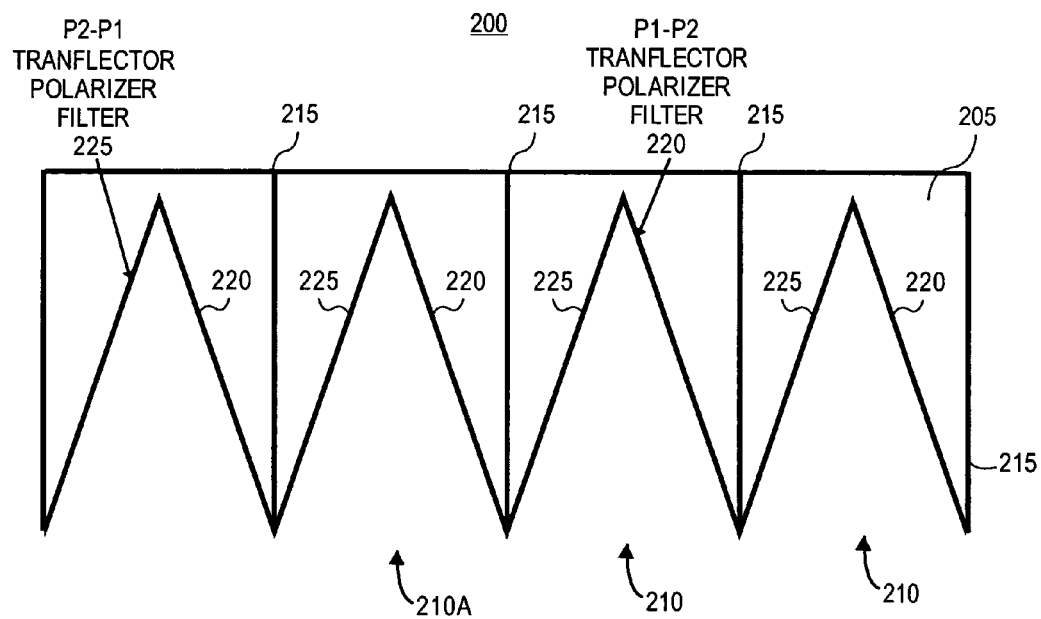
FIG. 2 illustrates a more detailed view of the optical polarizer screen in accordance with the another embodiment.

FIG. 2 depicts an exemplary microgroove array 200 of the optical polarizer screen 105 (shown in FIG. 1) in accordance with an embodiment of the invention. As shown in FIG. 2, the microgroove array 200 may include a substrate 205, grooves 210, and reflectors 215.

The substrate 205 may be a clear material such as acrylic, polycarbonate, thin glass, or other similar transparent material. Formed on the substrate may be the microgrooves 210. For example, microgroove 210A may be a V-shaped groove with an angle within the range of 30 to 70 degrees.

One side of the microgrooves 210 may be in contact with a P1-P2 transflector polarizer filter 220, i.e., transparent to P1 and reflective to P2. The other side of the microgrooves 210 may also be in contact with a P2-P1 transflector polarizer filter 225, transparent to P2 and reflective to P1. These transflector polarizer filters may be deposited onto the microgrooves 210 using deposition techniques or embedded onto the microgrooves 210 through a machine press or other similar technique.

The optical polarizer screen 200 may also include reflectors 215. The reflectors 215 may be configured to reflect all light. In some embodiments where high-index of refraction materials are used, the reflector may be a thin cut (slit, groove, etc.) in the substrate 205. In yet other embodiments, the reflectors 215 may be implemented using silver or other types of mirroring materials. The reflectors 215 may be positioned between the microgrooves 210. In some embodiments, the reflectors 215 are aligned along the joint or seam line between two microgrooves.

Figure 3:
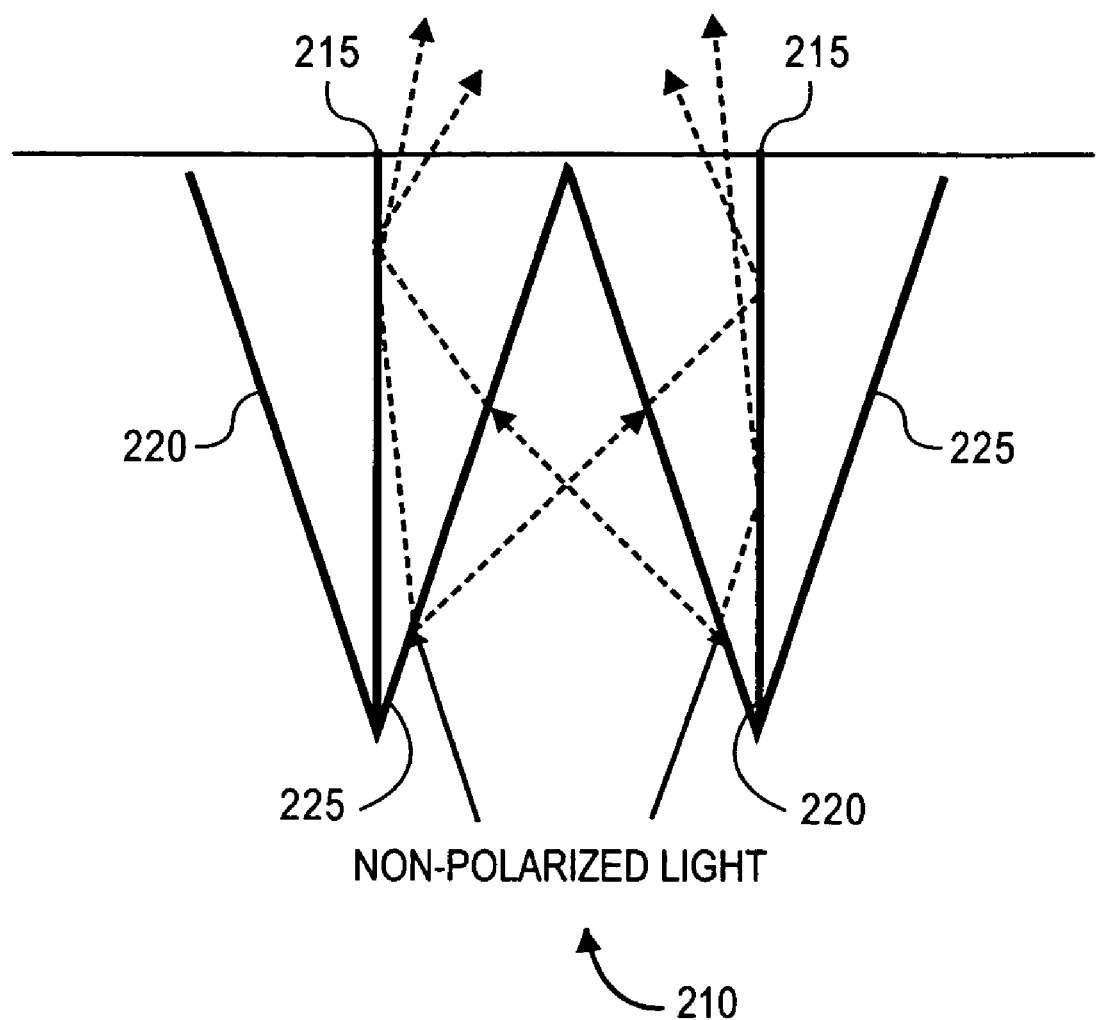
FIG. 3 depicts a more detailed view of a microgroove in accordance with yet another embodiment.

FIG. 3 illustrates the path for non-polarized light as it travels through a microgroove 200 shown in FIG. 2. As shown in FIG. 3, non-polarized light may enter the microgroove 210. For the light incident to the P1-P2 transflector filter 220, P1 polarized light may pass through the P1-P2 transflector filter while reflecting the P2 polarized light to the other side of the microgroove 210. The P1 polarized light may reflect off the reflector 215 towards an LCD array (e.g., the LCD array 110 shown in FIG. 1) The reflected P2 polarized light may pass through the P2-P1 transflector filter 225 and subsequently be reflected toward an LCD array (e.g., LCD array 110 shown in FIG. 1) by the reflector 215. Accordingly, the optical polarizer screen 105 may improve the efficiency of the backlighting by directing the incident light toward the appropriate filter with a minimum number of reflectors and refractors.

Similarly, for light incident to the P2-P1 transflector filter 225, P2 polarized light passes through the P2-P1 transflector filter while P1 polarized light is reflected toward the P1-P2 transflector filter 220. The polarized P2 light is reflected toward an LCD array (e.g., LCD array 110 shown in FIG. 1). The reflected P1 polarized light passes through the P1-P2 transflector filter 220, reflected off the reflector 215 towards an LCD array (e.g., LCD array 110 shown in FIG. 1).

Figure 4:
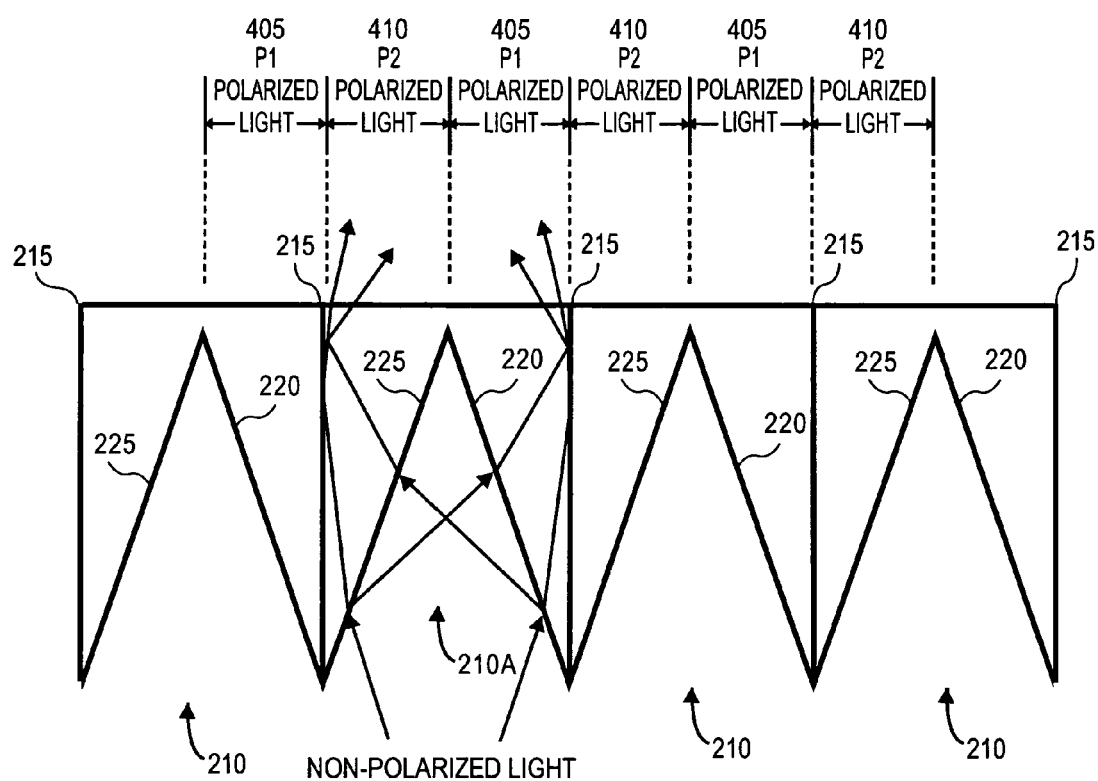
FIG. 4 illustrates a more detailed view of the system shown in FIG. 1 in accordance with yet another embodiment.

FIG. 4 depicts the output of the microgroove array 200 in accordance with another embodiment. As shown in FIG. 4, the light output from a microgroove 210 may be divided into P1 polarized output 405 and a P2 polarized output 410. More particularly, the side of the microgroove with the P1-P2 transflector filter 220 may output P1 polarized light and the side of the microgroove with the P2-P1 transflector filter 220 may output P2 polarized light.

Figure 5:
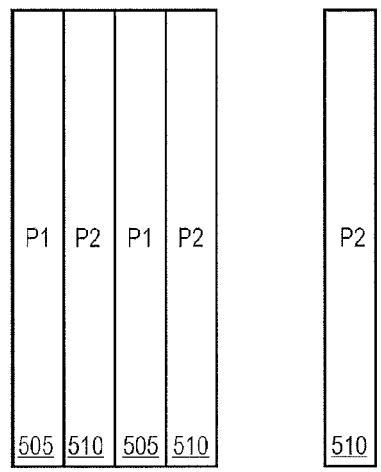
FIG. 5 illustrates a more detailed view of the polarizer film.

Returning to FIG. 1, the LCD array 110 may be implemented by conventional LCD arrays or LCD arrays designed to accommodate alternate cross-polarizers. The LCD arrays are well known to those skilled in the art. The system 100 also includes a polarizer film 115, which is depicted in FIG. 5 in a frontal view. As shown in FIG. 5, the polarizer film 115 may be comprised of alternating strips of P1 polarizing film 505 and P2 polarizing film 510. The width of the P1 polarizing film 505 may be equivalent to the width of the P2 output of a microgroove from the optical polarizer screen 105. Similarly, the width of the P2 polarizing film 510 may be substantially equivalent to the width of the P1 output of a microgroove from the optical polarizer screen 105. In some embodiments, the width may be substantially equivalent to one pixel of an accompanying LCD array.

The polarizer film 115 may be positioned so that the P2 polarizing film strips 510 covers the P1 output from the prismatic microgroove of the optical polarizer screen 105 through the LCD array 110. Similarly, the P1 polarizing film strips 505 may cover corresponding P2 output from the prismatic microgroove of the optical polarizer screen 105 through the LCD array 110.

Figure 6:
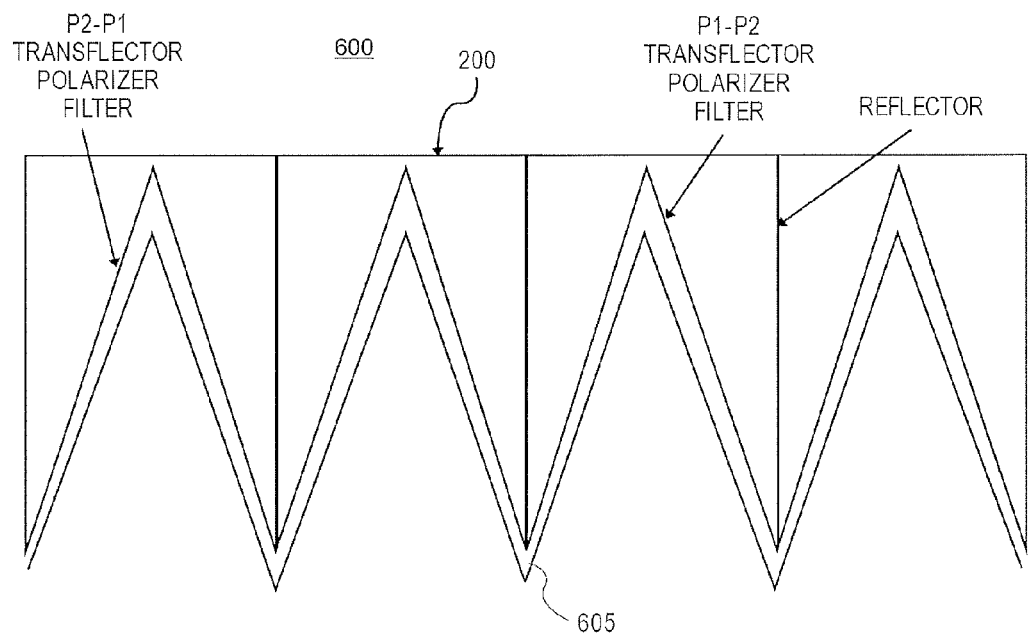
FIG. 6 illustrates yet another embodiment.
Figure 7:
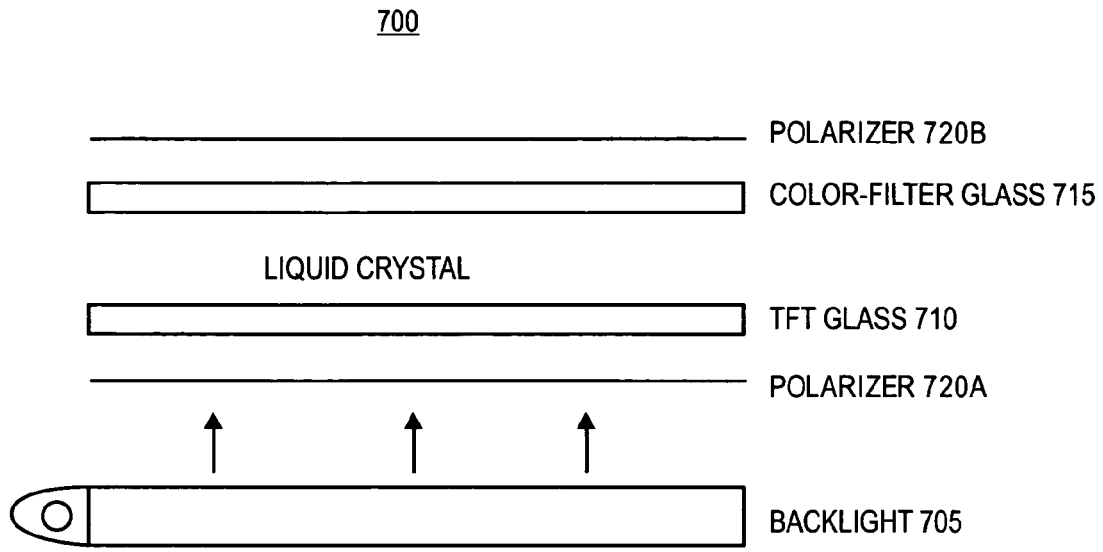
FIG. 7 illustrates a conventional system.
Figure 8:
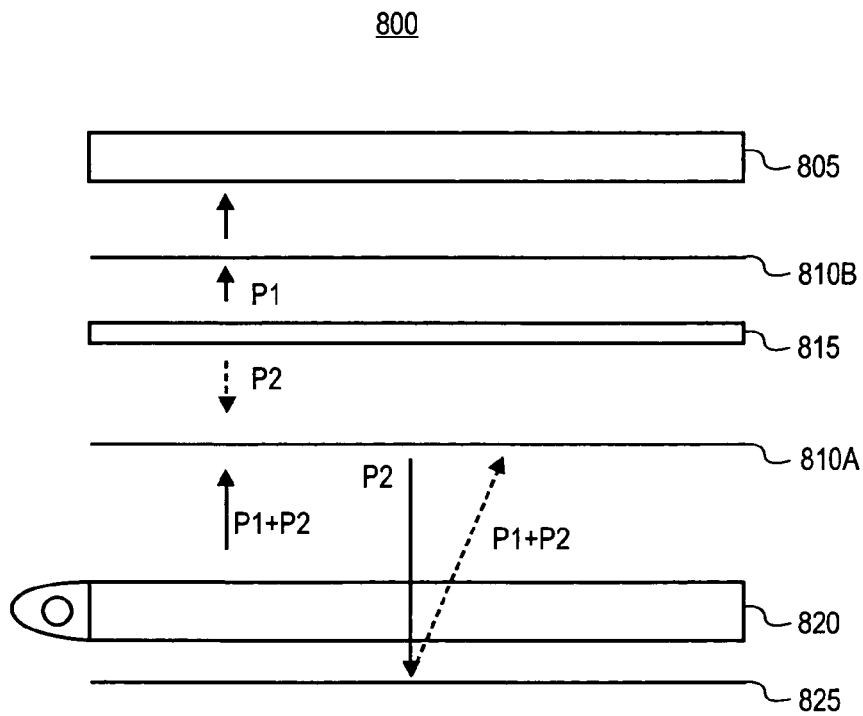
FIG. 8 illustrates another conventional system.

FIG. 6 illustrates another embodiment. As shown in FIG. 6, the system 600 includes the microgroove array 200 (as previously described with respect to FIG. 2). The system 600 may also include a high-index film 605. The high-index film 605 may be deposited over the microgrooves (or prismatic array) 200. The high-index film 605 may be implemented with a high-index of refraction material such as boro-silicon or other similar materials. The high-index film 605 may be configured to refract light to become more perpendicular to the microgrooves of the microgroove array 200.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. An apparatus for a liquid crystal display, the apparatus comprising:
    a polarizer film configured to receive light from the liquid crystal display; and
    an optical polarizer screen configured to filter light for the liquid crystal display, wherein the optical polarizer screen comprises a plurality of grooves, each groove being defined by a first side and a second side, the first side comprising a first polarizer and the second side comprising a second polarizer that differs from the first polarizer,
    wherein one of the first and second polarizers is transparent to light having a first polarization and reflective to light having a second polarization and the other of the first and second polarizers is transparent to light having the second polarization and reflective to light having the first polarization such that the optical polarizer screen is configured to output a plurality of regions of light of the first polarization and a plurality of regions of light of the second polarization.

2. The apparatus of claim 1, further comprising a plurality of reflectors, each reflector being positioned between two grooves.

3. The apparatus of claim 1, further comprising a high-index film is in contact with the one side of the optical polarizer screen, wherein the high-index film comprises of a high-index of refraction material.

4. The apparatus of claim 1, wherein the polarizer film comprises a plurality of alternately disposed regions having differing polarizations.

5. The apparatus of claim 1, wherein each alternately disposed region covers a corresponding region of light of one the first and second polarizations.

6. The apparatus of claim 1, wherein a width of an alternately disposed region is one pixel of the liquid crystal display.

7. A system for improved light efficiency, the system comprising:
    a liquid crystal display;
    a polarizer film configured to receive light from the liquid crystal display; and
    an optical polarizer screen configured to filter light for the liquid crystal display, wherein the optical polarizer screen comprises opposing input and output sides and a plurality of grooves, each groove being defined by a first side and a second side, the first side comprising a first polarizer and the second side comprising a second polarizer that differs from the first polarizer,
    wherein one of the first and second polarizers is transparent to light having a first polarization and reflective to light having a second polarization and the other of the first and second polarizers is transparent to light having the second polarization and reflective to light having the first polarization such that light that enters the input side is output through the output side of the optical polarizer screen in a plurality of alternating first and second regions of light, the first regions of light having the first polarization and the second regions having the second polarization.

8. The system of claim 7, wherein the grooves are prismatic microgrooves.

9. An apparatus for improved light efficiency, the apparatus comprising:
    a polarizer film adapted to filter light from a liquid crystal display; and an optical polarizer screen adapted to transmit light to the liquid crystal display, wherein the optical polarizer screen comprises opposing input and output sides and a plurality of grooves, each groove being defined by a first side and a second side, the first side comprising a first polarizer and the second side comprising a second polarizer that differs from the first polarizer, wherein one of the first and second polarizers is transparent to light having a first polarization and reflective to light having a second polarization and the other of the first and second transflective materials is transparent to light having the second polarization and reflective to light having the first polarization such that non-polarized light that enters the input side is output through the output side of the optical polarizer screen in a plurality of alternating first and second regions of light, the first regions of light having the first polarization and the second regions having the second polarization.

10. The apparatus of claim 9, further comprising a plurality of reflectors, each reflector being positioned between two grooves and implemented as a groove.

11. The apparatus of claim 10, wherein the polarizer film comprises a plurality of sections comprising a first polarizer material alternately disposed with a plurality of sections comprising a second polarizer material.

12. The apparatus of claim 11, wherein the sections comprising the first polarizer material of the polarizer film is positioned receive light from a corresponding region of light of the second polarization from the optical polarizer screen and the sections comprising the second polarizer material of the polarizer film is positioned to receive light from a corresponding region of light of the first polarization from the optical polarizer screen.

* * * * *